US010321190B2

(12) United States Patent
Goyal et al.

(10) Patent No.: US 10,321,190 B2
(45) Date of Patent: Jun. 11, 2019

(54) VIDEO CONTENT PRESENTMENT DEVICE

(71) Applicant: INTERNATIONAL BUSINESS MACHINES CORPORATION, Armonk, NY (US)

(72) Inventors: Munish Goyal, Yorktown Heights, NY (US); Wing L. Leung, Austin, TX (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 15/472,335

(22) Filed: Mar. 29, 2017

(65) Prior Publication Data
US 2018/0288481 A1 Oct. 4, 2018

(51) Int. Cl.
G06F 3/00 (2006.01)
G06F 13/00 (2006.01)
H04N 5/445 (2011.01)
H04N 21/466 (2011.01)
H04N 21/45 (2011.01)
G09B 5/06 (2006.01)
H04N 21/43 (2011.01)
H04N 21/442 (2011.01)
(Continued)

(52) U.S. Cl.
CPC ......... H04N 21/4667 (2013.01); G09B 5/065 (2013.01); H04N 21/4302 (2013.01); H04N 21/44218 (2013.01); H04N 21/4532 (2013.01); H04N 21/8545 (2013.01); H04L 67/10 (2013.01)

(58) Field of Classification Search
CPC .......... H04N 21/4667; H04N 21/4312; H04N 21/44222; H04N 21/4532; H04N 21/482; H04L 67/10
See application file for complete search history.

(56) References Cited

U.S. PATENT DOCUMENTS 7,203,620 B2    4/2007    Li
7,433,581 B2   10/2008    Lin
8,683,067 B2    3/2014    Herz
(Continued)

OTHER PUBLICATIONS

Peter Mell et al, The NIST Definition of Cloud Computing, National Institute of Standards and Technology, Publication 800-145, 2011.
(Continued)

*Primary Examiner* — Kyu Chae
(74) *Attorney, Agent, or Firm* — Patrick J. Daugherty; Daugherty & Del Zoppo Co., LPA

(57) ABSTRACT

Aspects provide for the automated presentation of media content portions in response to user cognition profile data. Processors determine content navigation actions by a user observing a presentation of a first media content item, identify note-taking actions of the user during the presentation of the first media content item, map the determined navigation actions and the note-taking activities to an attribute of a portion of the first media content item, and generate a rule to automatically drive navigation through different portions of a presentation of media content that includes the first attribute, in correlation to the navigation actions and the note-taking activities mapped to the subject or level of complexity.

19 Claims, 5 Drawing Sheets

(51) Int. Cl.
*H04N 21/8545* (2011.01)
*H04L 29/08* (2006.01)

(56) References Cited

U.S. PATENT DOCUMENTS

| | | | |
|---|---|---|---|
| 9,237,176 B2 | 1/2016 | Heinmiller et al. | |
| 2004/0197088 A1 | 10/2004 | Ferman et al. | |
| 2010/0046911 A1* | 2/2010 | Yachi | G09B 5/065 |
| | | | 386/343 |
| 2013/0004145 A1 | 1/2013 | Li | |
| 2017/0238026 A1* | 8/2017 | Agrawal | H04N 21/2387 |
| | | | 725/14 |

OTHER PUBLICATIONS

Disclosed Anonymously, A Cognitive System for Assisting Human Communication via Collaborative Curation and Production of Supporting Information, ip.com No. IPCOM000246390D, 2016.
Disclosed Anonymously, Method for Eye Based and Gesture Interactions with Context Aware 3D TV Video Objects, ip.com No. IPCOM000238796D, 2014.

* cited by examiner

VIDEO CONTENT PRESENTMENT DEVICE

BACKGROUND

Distance learning or mobile learning programs commonly incorporate lesson materials into media content presentations to reach users (clients, students, etc.) via audio and/or visual display components of the user's personal electronic devices (mobile phones, tablets, e-readers and other hand-held computerized devices; graphical user interface (GUI) displays driven by personal computers, clients or laptops; MP3, podcast and other audio players; etc.). Examples of media content presentations include audio content presentations (sound recordings of lectures, spoken word, live event sound recordings, sound effects, music, etc.); visual content presentations (still and moving graphic images, video and film recordings of live performances and events, animated depiction of graphic elements and movements, etc.) and audio/visual combinations (videos, movies, and television broadcasts of lectures, speakers, events, etc.) Such media content presentations may be live (in real-time), or they may be recorded and thereby repetitively listened to or viewed by a student user as often as needed or desired, and at any time of day or night convenient to the user.

During media content-based learning activity presentations, a user (viewer, listener, etc.) may need additional clarification of some aspect of the presented content in order to learn, understand or utilize the content, for example have a question that needs a satisfactory answer before concepts conveyed to the user by the media content are understood by the user. Accordingly, the user may stop and repeat or replay some portion of the media content, or pause a presentation while discussing or researching some aspect of the content, to gain more understanding, before resuming the content presentation. The user may also pause or repeat portions of the presentation to take notes upon or somehow annotate the content during the content presentation, in order to better assimilate the content conveyed or to later use the material is some application.

User-initiated interruptions and repetitions in media content presentations necessary for the comprehension of concepts conveyed to the user may be difficult to execute by the user without disrupting the focus and attention of the user, including the user's ability to follow a narrative or other organizing structure of the content presentation. The time (and efforts) expended by the user in pausing or selecting and repeating portions of the content repetition also adds to a total time and energy expended by the user to observe and assimilate the presented media content, thereby proportionately reducing the efficiencies that may be obtained through such presentations relative to live, in-class instruction.

SUMMARY

In one aspect of the present invention, a computerized method for the automated presentation of media content portions in response to user cognition profile data includes executing steps on a computer processor. Thus, a computer processor determines content navigation actions by a user observing a presentation of a first media content item; identifies note-taking actions of the user during the presentation of the first media content item; maps the determined navigation actions and the note-taking activities to an attribute of a portion of the first media content item; and generates a rule to automatically drive navigation through different portions of a presentation of media content that includes the first attribute, in correlation to the navigation actions and the note-taking activities mapped to the subject or level of complexity.

In another aspect, a system has a hardware processor in circuit communication with a computer readable memory and a computer-readable storage medium having program instructions stored thereon. The processor executes the program instructions stored on the computer-readable storage medium via the computer readable memory and thereby determines content navigation actions by a user observing a presentation of a first media content item; identifies note-taking actions of the user during the presentation of the first media content item; maps the determined navigation actions and the note-taking activities to an attribute of a portion of the first media content item; and generates a rule to automatically drive navigation through different portions of a presentation of media content that includes the first attribute, in correlation to the navigation actions and the note-taking activities mapped to the subject or level of complexity.

In another aspect, a computer program product for the automated presentation of media content portions in response to user cognition profile data has a computer-readable storage medium with computer readable program code embodied therewith. The computer readable hardware medium is not a transitory signal per se. The computer readable program code includes instructions for execution which cause the processor to determine content navigation actions by a user observing a presentation of a first media content item; identify note-taking actions of the user during the presentation of the first media content item; map the determined navigation actions and the note-taking activities to an attribute of a portion of the first media content item; and generate a rule to automatically drive navigation through different portions of presentation of media content that includes the first attribute, in correlation to the navigation actions and the note-taking activities mapped to the subject or level of complexity.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
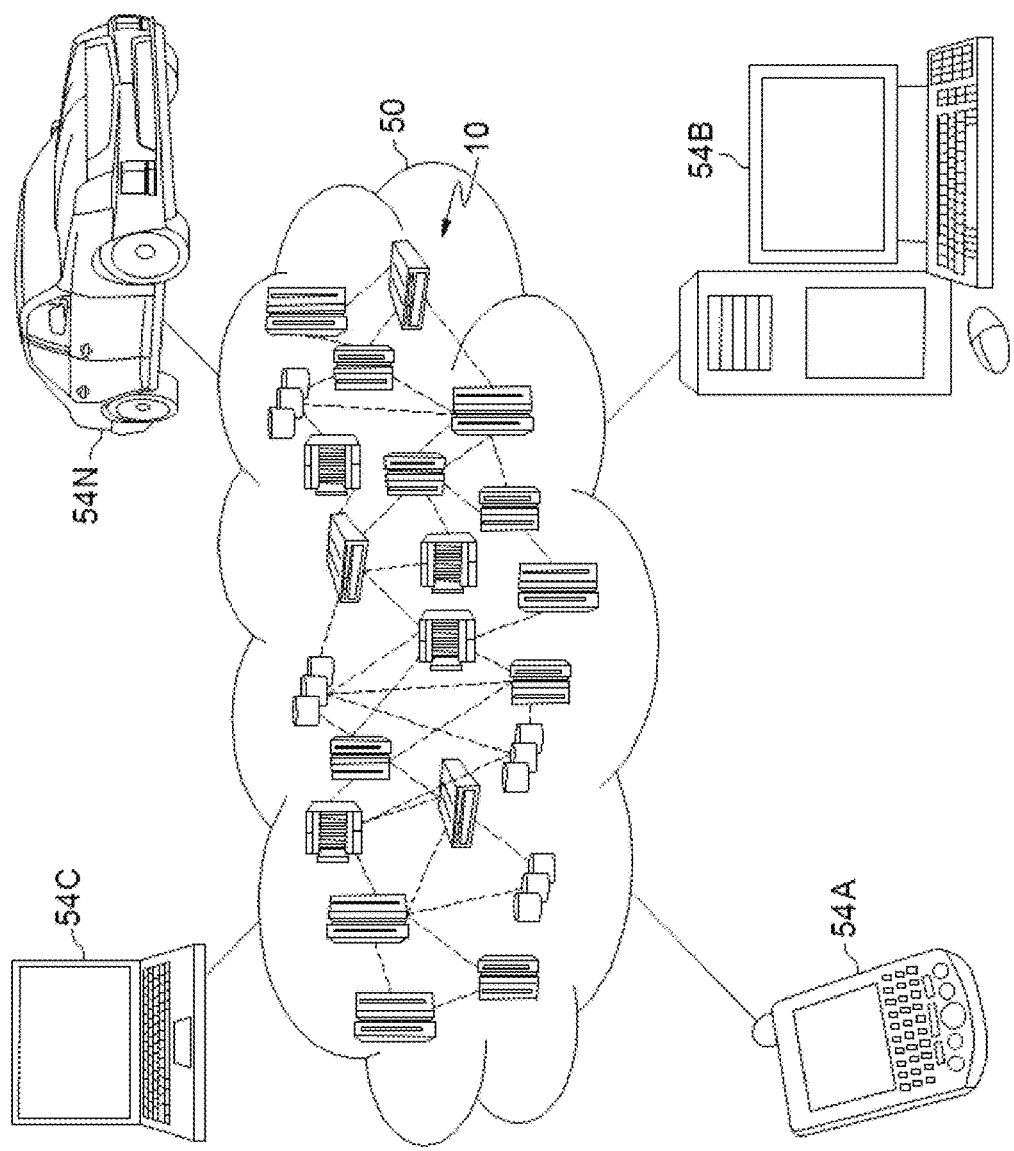
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
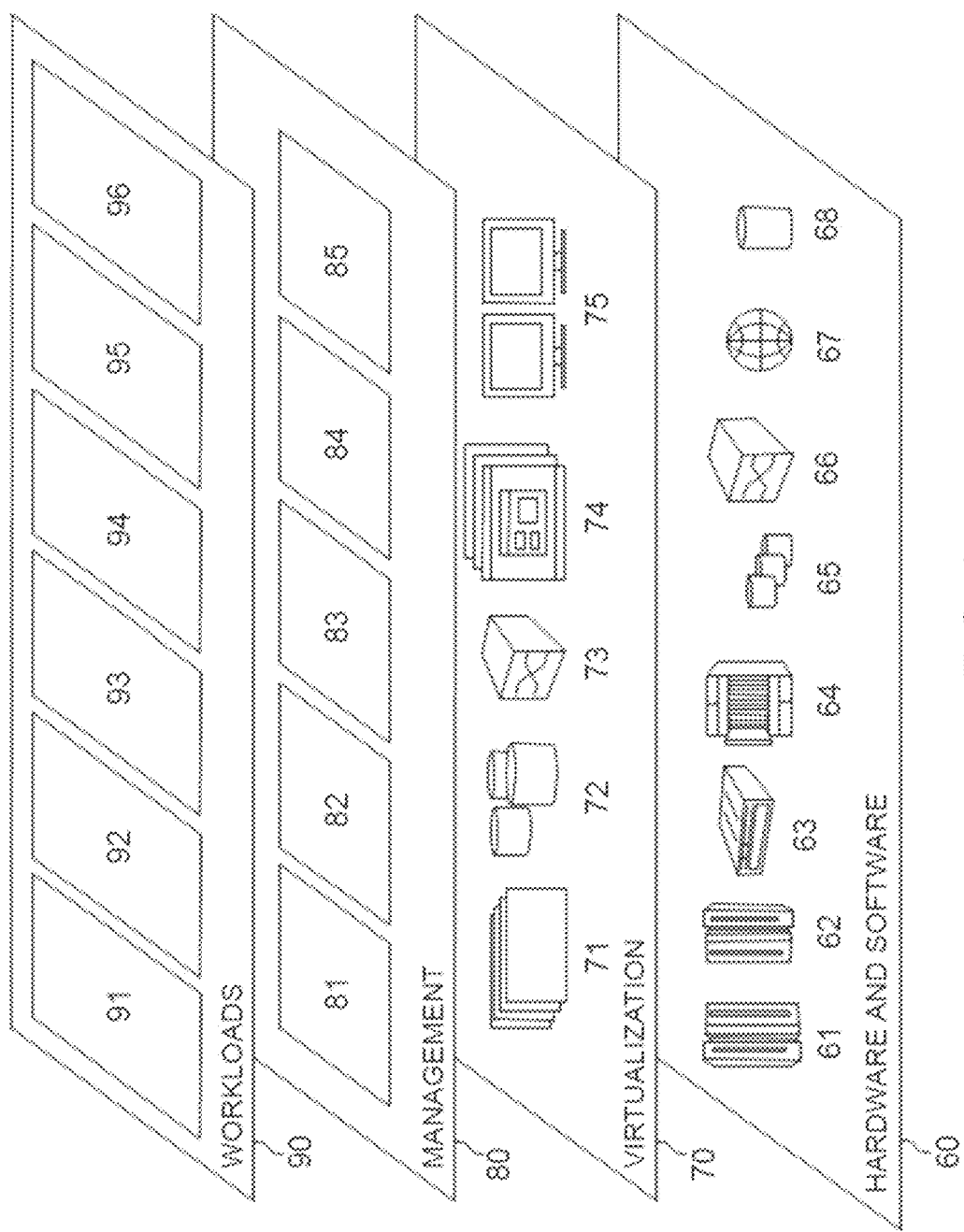
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for the automated presentation of media content portions in response user cognition profile data 96 (as described below).

Figure 3:
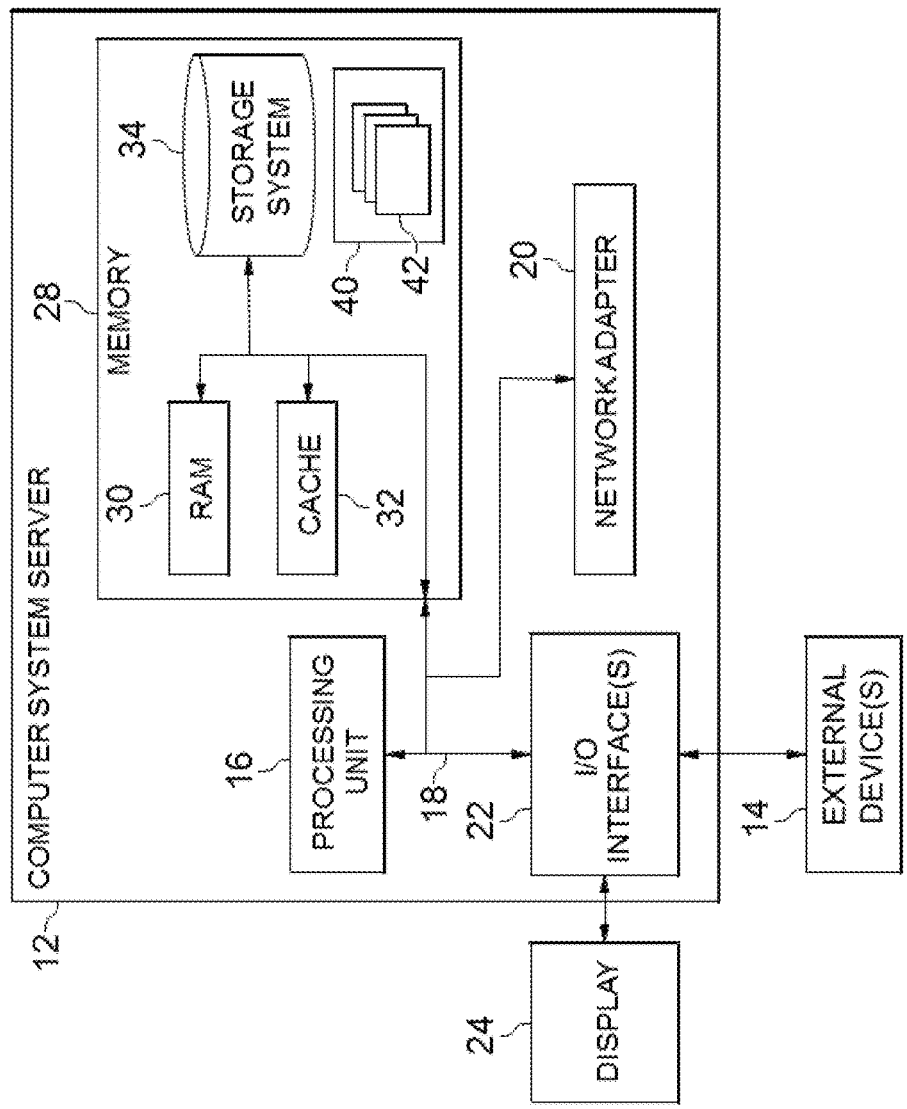
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
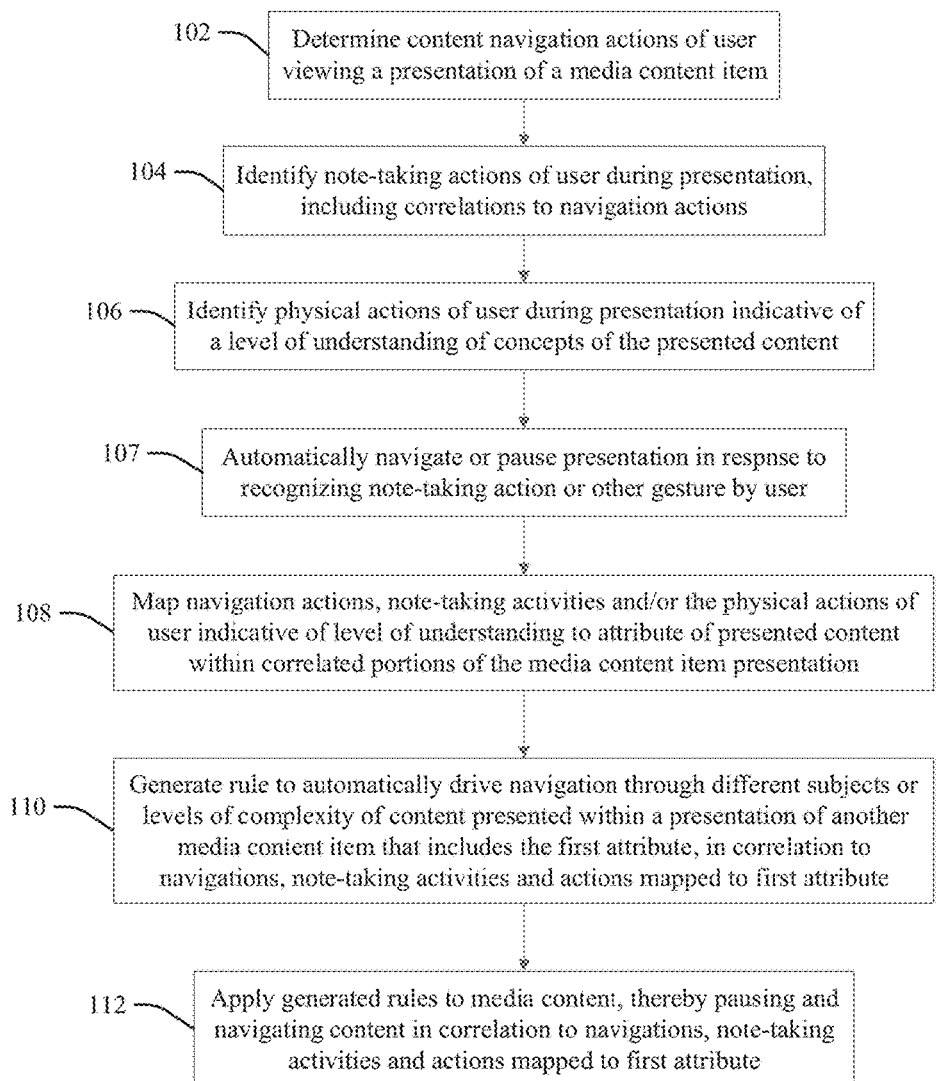
FIG. 4 is a flow chart illustration of an embodiment of the present invention.

FIG. 4 illustrates a process or system according to the present invention for the automated presentation of media content portions in response to user cognition profile data. At 102 a processor that is configured according to an aspect of the present invention (the "configured processor") determines content navigation actions of the user in observing (viewing and/or listening to) a presentation of a particular (first) media content item. The configured processor may be implemented in accordance with the computer system server 10 of FIG. 3, including as the cloud node 10 of FIG. 1, as described respectively above.

The content navigation actions include different discrete navigation actions, and/or patterns thereof, by the user that include pauses, speed-ups or slow-downs of a presentment speed, fast forwards, skips, and replays of discrete portions of the media content, and durations and timings of the actions, including in correlation to others of the navigation actions. The navigation actions may be determined from control inputs to a device presenting the media content to the user (remote control buttons, GUI icon selections via cursor inputs, voice control commands, etc.), or via direct monitoring physical actions of the user (for example, image data received from a camera that includes physical movements of the user associated with triggering a navigation action; voice data obtained from a microphone device that includes spoken words associated with navigation commands or inputs, etc.)

At 104 the configured processor identifies note-taking actions of the user during the presentation (as indicated by microphone or camera device data), and in some aspects including correlating the note-taking actions with the navigation actions and/or with portions of the (first) media content presentation that are immediately prior in time and/or contemporaneous in time with said note-taking (thereby sometimes associating the note-taking action with a subject presented within a portion of the presentation immediately preceding the note taking, or a pause navigation, etc.). Examples of note-taking actions include image data indicating user's actions in picking up a pen or stylus for writing, followed by writing movements with the pen or stylus, and ending with the cessation of the writing movements (pausing in the act of writing for a minimum "stopped writing" threshold pause time, setting the pen or stylus down, etc.); direct text inputs from an electronic pen or stylus; motion sensors inputs from the pen or stylus correlated with writing movements; etc.

At 106 the configured processor identifies other physical actions of the user during the presentation of the first media content item that are indicative of a level of comprehension or cognitive understanding, or failure to comprehend or understand, underlying concepts of the presented content, sometimes hereinafter referred to as "cognitive level indicators." Examples of cognitive level indicators include facial expressions, gestures and visual sentiment cues recognized (via image analysis of camera data inputs) of the user that are associated (mapped to) expressions of understanding, or instead of puzzlement/incomprehension, in a training set of images; auditory data content phrases (parsed and identified via voice analysis) that are determined to indicate that the user understands the content (for example, "I see now," "Amazing," etc.), or does not understand ("What?", "This makes no sense," etc.); durations of speech by the user within the presence of other people, indicative of comprehension of an underlying concept, such as explanatory phrases to others, or instead questions to others that indicate puzzlement/incomprehension in the content, and the need for explanation from the others; user initiations and executions of queries and searches for additional or clarifying information via browsers or other input fields during discrete portions of the presentation, including regarding topics relevant to those conveyed in the presentation, which are indicative of puzzlement/incomprehension of the user and a corresponding need for additional information from the search queries; and still other actions indicative of understanding or confusion/not understanding presentation content during the presentation will be apparent to one skilled in the art.

At 107 the configured processor automatically navigates or pauses presentation of the media item in response to recognizing a note-taking action by the user at 104, or a gesture at 106. Thus, the aspect observes the user's behavior (via camera, microphone, GUI inputs or other data inputs) and pauses the presentation in response to determining that the user is speaking or is about to speak to others in the room (such as to explain a concept, or ask a question, or otherwise wants to contribute to a discussion), or has taken a pen in hand, etc. The configured processor extends the pause for a threshold wait period of time, or until determining an indication that a conversation between the user and others is complete (for example, after a threshold period of silence indicating that speaking has stopped) or that note-taking actions has ceased (for example, the pen or stylus is put down, no text character inputs are received over a threshold time signifying the end of note taking, etc.), prior to replaying or restarting the media presentation. Thus, the aspect determines in real-time that the user is likely to benefit from a pause, in order to take notes, ask questions, explain the content to others, and only resumes when the user is ready to again pay attention to the media presentation rather than engage in the note-taking or conversational activities.

The configured processor may also navigate the media in response to the observations at 107, for example fast forwarding or skipping material in response to a verbal or gesture commend to "skip to the next lesson," or replaying some portion in response to a "play that back" command or gesture. Aspects thus monitor the user's behavior in real-time, and thereby control the navigation of the media content. The configured processor gathers data indicative of real-time behavior by the user as viewer or consumer, analyzes the data and predicts and executes video navigation steps that are likely appropriate to the needs of the user.

At 108 the configured processor maps the navigation actions determined at 102 (pauses, fast forwards, skips, replays, etc.), the note-taking activities identified at 104 and/or the physical actions of user indicative of a level of understanding determined at 106 to different subjects or levels of complexity of the presented content within respective correlated portions of the of the media content item presentation.

At 110 the configured processor generates one or more rules to automatically drive navigation through different subjects or levels of complexity of presented content within the current, or a subsequent, media presentation to the user as a function of the mappings determined at 108: namely, to automatically drive navigation through media content item comprising the first attribute in correlation to the navigation actions and the note-taking activities mapped to the first attribute at 108.

The configured processor may generate navigation rules based on historic user data indicating numbers of times viewed, viewer's associated statistics and durations of views. For example, the configured processor may predict that a user will not want to pause and resume from time to time while viewing a video for the second or third time with the same frequency as exhibited during initial viewing(s), and thereby generate a rule that reduces a number of pauses, or time duration of the pauses, executed during an earlier video presentment for a current or later presentment.

The configured processor may also predict that user will not want to pause and explain additional content to a same set of other viewers/listeners of a media presentation users during a second viewing, and thereby generate a rule to reduce a number of pauses, or time duration of the pauses, executed during an earlier video presentment for a current presentment. Thus, in response to determining that during a first viewing of a certain video a user paused for five (5) minutes to take notes, the configured processor automatically generate a rule to provide only two (2) minutes of pauses during a second showing of the video to this user, in response to determining that the user is likely to have a familiarity of the subject matter from the first viewing and not need the same amount of pause time to take notes, ask questions, etc.

The configured processor may confirm rule determinations by processing image and other sensor data of the user's behavior (from cameras, microphones, etc.) acquired during the second viewing, and thereby determine (recognize) that the user has a better understanding of the subject matter during the second viewing relative to the first viewing, based on observed interactions with others or a display device (via navigation data inputs), facial expressions, gestures picking up pens to take notes, discussions between viewers, etc.

At 112 the configured processor applies the generated rule(s) to media content currently presented to the user, thereby pausing and navigating through the content in correlation to the navigations and pauses observed (at 102, 104 and 106) or automatically executed (at 107) relative to the previous presentment of content comprising the first attribute.

Aspects gather and analyze user data generated in consuming media items to identify patterns of user video navigation application to attributes of media presentation, creating correlations of media presentation navigations with a variety of other parameters, wherein each correlation may define a media navigation rule. During media playback, aspects use data from cameras, microphones and other sensor devices to identify presentation parameter applicable to the user, including identifying likelihoods for when the user wants a pause in presentation of content regarding a certain subject or having a certain complexity, when user wants to replay particular content, which contents should be replayed, when to speed or slow play back, etc. Navigation is performed automatically, based on selection and application of an appropriate rule for the subject or complexity for this user.

More particularly, pauses, rewinds, or presentation slowdowns determined at 102, note taking actions of the user determined at 104, cognitive level indicators determined at 106 and automatically generated pauses or other navigations executed at 107 may each (or in combination) indicate to the configured processor that the user has a relative (low, medium, high, etc.) level of understanding, or of incomprehension, by the user, wherein the configured processor maps this data at 108 to presentment of a first content attribute (subject or complexity level, etc.). Accordingly, at 110 the configured processor generates a first rule for pausing or navigating subsequent presentation of media content to mimic or correlate to the navigation actions of the user during earlier presentments of a same or similar subject or complexity, for example pausing for an appropriate (or default) pausing period to automatically give the user another opportunity to take notes, ask questions, explain to others, etc., during the pause, and thus enabling the user to better understand or expand upon the subject matter.

With respect to mappings at 108 to presentment of a second attribute (a different subject, or a different level of complexity, relative to the first attribute) during the media presentation, wherein the user (or device automatically at 107) sped-up a presentment speed or executed a fast forward or a skip (as determined at 102); and the configured processor determined an absence of note-taking actions at 104 and/or determined a cognitive level indicator at 106 of the user explaining the second subject to another person, at 110 the configured processor generates a second rule for speeding up or skipping over a portion of a subsequent presentation of media content including the second attribute subject or complexity level (for example, for an equivalent period fast-forwarding or speeding up observed during the first media presentation). The configured processor generates the second rule in response to determining that the user likely understands this material, and that it would be more time efficient for the user to move more quickly through content having the second subject or complexity level, wherein the user may focus more attention to other subjects or more complex subjects presented by the media presentation.

Figure 5:
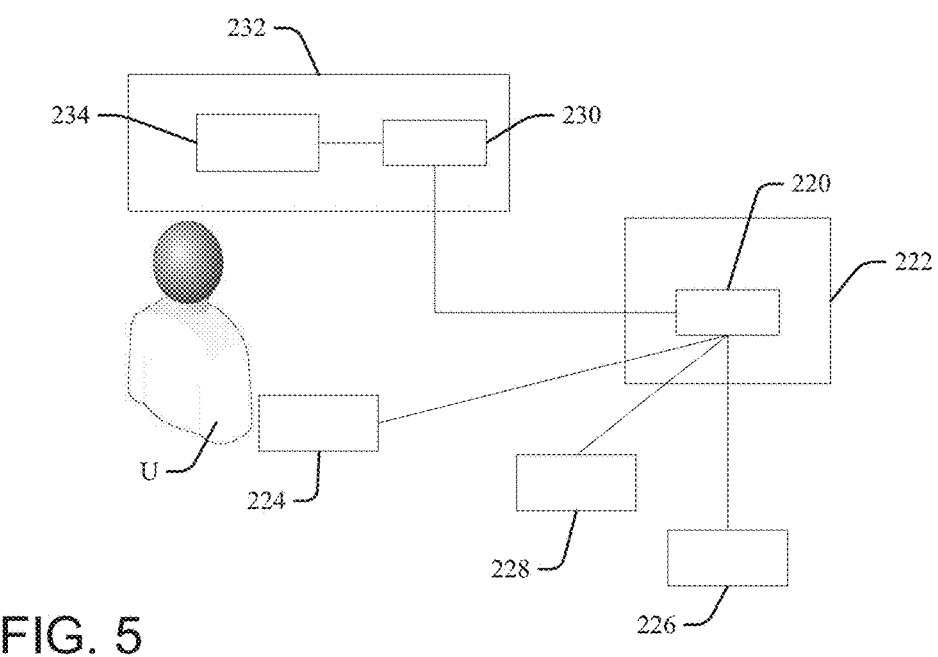
FIG. 5 is a block diagram illustration of an embodiment of the present invention.

FIG. 5 is a block diagram illustration of an implementation of an aspect of the present invention. The gestures and action of a user "U" viewing a video presentation on a display screen 234 of a multimedia device 232 are observed by computerized device 222 processor 220 that is configured according to an aspect of the present invention (the configured processor 220) via a camera 228 and a microphone 226. Note-taking action data inputs are received by the configured processor 220 from a personal tablet device 224 of the user U.

The configured processor 220 is also in circuit communication with a controller 230 of the multimedia device 232. Content navigation actions executed by the user U via the controller 230 in viewing the video presentation on the display screen 234 are thereby provided as inputs to the configured processor 220 (at step 102, FIG. 4)

The configured processor 220 identifies (at 104, FIG. 4) note-taking actions of the user U during the video presentation from input data of the microphone 226, camera 228 or tablet device 224 (for example, from a stylus component thereof, not shown), and correlates note-taking action inputs to the navigation data from the controller 230 and/or to portions of the video presentation that are immediately prior in time and/or contemporaneous in time with the note-taking inputs.

The configured processor 220 also identifies cognitive level indicators from inputs of one or more of the microphone 226, camera 228 and tablet device 224 that are indicative of physical actions of the user U, and thereby a level of comprehension or cognitive understanding, or failure to comprehend or understand, underlying concepts of the presented content (at 106, FIG. 4). The configured processor 220 automatically navigates or pauses the video presentation in response to recognizing a note-taking action or appropriate gesture by the user U (at 107, FIG. 4).

Thus, the configured processor 220 maps (at 108, FIG. 4) navigation actions, note-taking activities, physical actions indicative of a level of understanding to different subjects or levels of complexity of the video presentation; generates (at 110, FIG. 4) one or more rules to automatically drive navigation through different subjects or levels of complexity of the video presentation as a function of the mappings; and (at 112, FIG. 4) applies the generated rule(s) to the video presentation, thereby driving the controller 230 to pause or navigate through the content in correlation to navigations, pauses, etc., observed or automatically executed relative to a previous presentment of content comprising the first attribute.

Aspects of the present invention determine the cognitive ability of a media user to comprehend underlying or conveyed content based on real time interactions or historical references of the user, including those captured by cameras, microphones or other sensors of the aspect system. Aspects interpret real time interactions (facial expressions, gestures, visual sentiment cues) to determine rules for generating pauses, play back rate changes and restarts of media content.

User data generated from the capture of cognitive ability of the users interacting with aspects of the present invention may be used with a corpus of data generated for other users, leveraging additional analysis outside the scope of the present invention.

By recognizing or understanding the conveyed or underlying subject matter or complexity of content of a media presentation, and the current cognitive ability of the viewer as indicated by the collected data or other user profile data (for example, age, education level, standardized test scores, etc.), aspects automatically adjust the rate or amount of content conveyed to better serve the cognitive needs of the user. For example, a high school student with no prior algebra experience watching a video for "Introductory Algebra" will generally have a different cognitive ability to comprehend content communicated therein, as compared to a college math major watching the same video to refresh concepts previously learned. Aspects optimize content navigation or pace of delivery of the "Introductory Algebra" video differently for the two viewers: maximizing amounts of content, and slowing the pace thereof, for the high school student, while increasing the speed of presentation, skipping over review exercise sections, etc., for the college student. Aspects thereby bridge a gap in the respective learning needs of the different students by adjusting the video play back differentially to match their individual ability to learn or understand the content.

Aspects may analyze media content to identify the different subjects or levels of complexity presented in a given item presentation, and thereby segment the content into chunks having varying degrees of difficulty (for example, light, medium and heavy content portions), or levels of cognitive ability needed to understand the content. Using historical interactions of a user determined from earlier content presentations, aspects may estimate the cognitive ability of the user to understand the current content. Differentials determined between an estimated ability of a user and an ability needed for each segmented chunk of the video may be used to adjust or define a play back rate and/or pauses needed when playing segments of the media content for the user as consumer.

Media presentation navigation rules are automatically created wherein, based on audience facial expressions and body language, aspects determine if user has likely understood the content, or not. For example, if determined from gesture data (at 106, FIG. 4) that a viewer has likely not understood a first subject when presented, an aspect may automatically replay subsequent portions of content of the media item as they arise that have similar contextual complexities or content, in anticipation that the viewer will likely fail to understand the subsequent portions as well, without repetition generated by application of the rule.

Aspects also incorporate learning systems and mechanisms to automatically revise or train generated rules over iterations of applications of the rules during multiple media presentations to users. Aspects also adapt content presentation rates and pauses in real-time, based on feedback from determinations of the viewer's response to the presented item. For example, aspects may slow down, pause or repeat portions of a presentation in response to real-time indications from facial expression analysis that the user is not understanding the subject matter, or inputs from writing instruments indicating that the user is picking up the instrument to take notes. Conversely, aspects may speed up the presentation rate, or skip review material, etc., in response to real-time indications from facial expression or gesture analysis that the user understands the subject matter, or that the user is no longer paying close attention to the presentation, indicating that the user is bored or otherwise not fully engaged by the complexity of the presented material, and that truncating the presentation may help hold the user's attention.

Thus, based on real-time pause inputs from the user aspects may identify an appropriate rate or amount of presentment of media item contents, learning an optimized rate or amount based on the user's responses in a real-time feedback process. For example, an aspect may initially present content from an item at an initial, slow rate, with large pauses, to provide sufficient time for users within a given audience to mimic or comprehend the material based on their ages or other user profile data, and revise the rate or pause amounts in response to understanding perceived from data collected from the audience. As response data for the audience is accumulated, aspects progressively optimize the presentation rate and pause metrics in response to feedback from detected facial expressions, gestures, etc., for example progressively reducing pause values in response to indications that understanding of the content by the audience members is improving, or slowing down the presentation rate in response to determining that audience data does not indicate an improvement of understanding.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor the steps of:
   determining content navigation actions by a user observing a presentation of a first media content item, wherein the content navigation actions are selected from the group consisting of a pause in the presentation, a presentation speed speed-up, a presentation speed slow-down, a fast forward of the presentation, a skip of a portion of the presentation, and a replay of a portion of the media content item;
   identifying note-taking actions of the user during the presentation of the first media content item;
   mapping the determined navigation actions to the note-taking activities and to a first attribute of a first portion of the first media content item, wherein the first attribute is selected from the group consisting of a first subject of content of the first portion and a level of complexity of the content of the first portion; and
   automatically driving navigation through different aspects of content presented within different portions of media content in correlation to the navigation actions mapped to the note-taking activities and the first attribute, wherein the different aspects of content are selected from the group consisting of different subjects and different levels of complexity.

2. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the steps of determining the content navigation actions by the user observing the presentation of the first media content item, identifying the note-taking actions of the user during the presentation of the first media content item, mapping the determined navigation actions and the identified note-taking activities to the first attribute of the first portion of the first media content item, and automatically driving navigation through the different aspects of content presented within the different portions of the media content that comprise the first attribute in correlation to the navigation actions and the identified note-taking activities mapped to the first attribute.

3. The method of claim 2, wherein the computer-readable program code is provided as a service in a cloud environment.

4. The method of claim 1, wherein the automatically driving navigation through the different aspects of content presented within different portions of media content comprises applying a first navigation action to a presentation of a second media content item that comprises the first attribute of the first media content item, in response to determining that the user has a low level of understanding of the first attribute of the first media content item; and
   wherein the first navigation action is selected from the group consisting of the pause, the replay and the presentation speed slow-down.

5. The method of claim 4, further comprising:
   determining that the user has the low level of understanding of the first attribute of the first media content item from a low-level indicator selected from the group consisting of:
   a correlation of a note-taking action of the user during the presentation of the first media content item with the first attribute; and
   identifying a physical action of the user during the presentation of the first media content item that is indicative of a low level of comprehension of the first attribute of the first media content item by the user.

6. The method of claim 5, wherein the physical action of the user during the presentation of the first media content item that is indicative of the low level of comprehension of the first attribute is selected from the group consisting of a facial expression, a gesture, a question posed by the user to another person during the presentation that is relevant to the first attribute, and a search by the user via a browser for a topic relevant to the first attribute during the presentation.

7. The method of claim 1, wherein the automatically driving navigation through the different aspects of content presented within different portions of media content comprises applying a second navigation action to a presentation of a second media content item that comprises the first attribute of the first media content item, in response to determining that the user has a high level of understanding of the first attribute of the first media content item; and
   wherein the second navigation action is selected from the group consisting of the presentation speed speed-up, the fast forward of the presentation, and the skip of the portion of the presentation.

8. The method of claim 7, further comprising:
   determining that the user has the high level of understanding of the second attribute of the first media content item from a high-level indicator selected from the group consisting of:
   an absence of a correlation of a note-taking action of the user during the presentation of the first media content item with the second attribute; and
   identifying a physical action of the user during the presentation of the first media content item that is indicative of a high level of comprehension of the second attribute of the first media content item by the user.

9. The method of claim 8, wherein the physical action of the user during the presentation of the first media content item that is indicative of the high level of comprehension of the second attribute is selected from the group consisting of another facial expression, another gesture, and an auditory data content phrase spoken by the user to another person that is explanatory of the second attribute.

10. A system, comprising:
    a processor;
    a computer readable memory in circuit communication with the processor; and
    a computer readable storage medium in circuit communication with the processor;
    wherein the processor executes program instructions stored on the computer-readable storage medium via the computer readable memory and thereby:
    determines content navigation actions by a user observing a presentation of a first media content item, wherein the content navigation actions are selected from the group consisting of a pause in the presentation, a presentation speed speed-up, a presentation speed slow-down, a fast forward of the presentation, a skip of a portion of the presentation, and a replay of a portion of the media content item;

identifies note-taking actions of the user during the presentation of the first media content item;
maps the determined navigation actions to the note-taking activities and to a first attribute of a first portion of the first media content item, wherein the first attribute is selected from the group consisting of a first subject of content of the first portion and a level of complexity of the content of the first portion; and
automatically drives navigation through different aspects of content presented within different portions of media content in correlation to the navigation actions mapped to the note-taking activities and the first attribute, wherein the different aspects of content are selected from the group consisting of different subjects and different levels of complexity.

11. The system of claim 10,
wherein the processor executes the program instructions stored on the computer-readable storage medium via the computer readable memory and thereby automatically drives navigation through the different aspects of content presented within different portions of media content by applying a first navigation action to a presentation of a second media content item that comprises the first attribute of the first media content item, in response to determining that the user has a low level of understanding of the first attribute of the first media content item; and
wherein the first navigation action is selected from the group consisting of the pause, the replay and the presentation speed slow-down.

12. The system of claim 11, wherein the processor executes the program instructions stored on the computer-readable storage medium via the computer readable memory and thereby:
determines that the user has the low level of understanding of the first attribute of the first media content item from a low-level indicator selected from the group consisting of:
a correlation of a note-taking action of the user during the presentation of the first media content item with the first attribute; and
identifying a physical action of the user during the presentation of the first media content item that is indicative of a low level of comprehension of the first attribute of the first media content item by the user.

13. The system of claim 12, wherein the processor executes the program instructions stored on the computer-readable storage medium via the computer readable memory and thereby automatically drives navigation through the different aspects of content presented within different portions of media content by applying a second navigation action to a presentation of a second media content item that comprises the first attribute of the first media content item, in response to determining that the user has a high level of understanding of the first attribute of the first media content item; and
wherein the second navigation action is selected from the group consisting of the presentation speed speed-up, the fast forward of the presentation, and the skip of the portion of the presentation.

14. The system of claim 13, wherein the processor executes the program instructions stored on the computer-readable storage medium via the computer readable memory and thereby determines that the user has the high level of understanding of the second attribute of the first media content item from a high-level indicator selected from the group consisting of:
an absence of a correlation of a note-taking action of the user during the presentation of the first media content item with the second attribute; and
identifying a physical action of the user during the presentation of the first media content item that is indicative of a high level of comprehension of the second attribute of the first media content item by the user.

15. A computer program product, comprising:
a computer readable storage medium having computer readable program code embodied therewith, wherein the computer readable storage medium is not a transitory signal per se, the computer readable program code comprising instructions for execution by a processor that cause the processor to:
determine content navigation actions by a user observing a presentation of a first media content item, wherein the content navigation actions are selected from the group consisting of a pause in the presentation, a presentation speed speed-up, a presentation speed slow-down, a fast forward of the presentation, a skip of a portion of the presentation, and a replay of a portion of the media content item;
identify note-taking actions of the user during the presentation of the first media content item;
map the determined navigation actions to the note-taking activities and to a first attribute of a first portion of the first media content item, wherein the first attribute is selected from the group consisting of a first subject of content of the first portion and a level of complexity of the content of the first portion; and
automatically drive navigation through different aspects of content presented within different portions of media content in correlation to the navigation actions mapped to the note-taking activities and the first attribute, wherein the different aspects of content are selected from the group consisting of different subjects and different levels of complexity.

16. The computer program product of claim 15,
wherein the computer readable program code instructions for execution by the processor further cause the processor to automatically drive navigation through the different aspects of content presented within different portions of media content by applying a first navigation action to a presentation of a second media content item that comprises the first attribute of the first media content item, in response to determining that the user has a low level of understanding of the first attribute of the first media content item; and
wherein the first navigation action is selected from the group consisting of the pause, the replay and the presentation speed slow-down.

17. The computer program product of claim 16, wherein the computer readable program code instructions for execution by the processor further cause the processor to determine that the user has the low level of understanding of the first attribute of the first media content item from a low-level indicator selected from the group consisting of:
a correlation of a note-taking action of the user during the presentation of the first media content item with the first attribute; and
identifying a physical action of the user during the presentation of the first media content item that is indicative of a low level of comprehension of the first attribute of the first media content item by the user.

18. The computer program product of claim 17, wherein the computer readable program code instructions for execution by the processor further cause the processor to automatically drive navigation through the different aspects of content presented within different portions of media content by applying a second navigation action to a presentation of a second media content item that comprises the first attribute of the first media content item, in response to determining that the user has a high level of understanding of the first attribute of the first media content item; and wherein the second navigation action is selected from the group consisting of the presentation speed speed-up, the fast forward of the presentation, and the skip of the portion of the presentation.

19. The computer program product of claim 18, wherein the computer readable program code instructions for execution by the processor further cause the processor to determine that the user has the high level of understanding of the second attribute of the first media content item from a high-level indicator selected from the group consisting of:

an absence of a correlation of a note-taking action of the user during the presentation of the first media content item with the second attribute; and identifying a physical action of the user during the presentation of the first media content item that is indicative of a high level of comprehension of the second attribute of the first media content item by the user.

* * * * *